(12) United States Patent
Fenton

(10) Patent No.: US 11,136,073 B2
(45) Date of Patent: ***Oct. 5, 2021

(54) SPLINE JOINTS AND CONTAINER HAVING SAME

(71) Applicant: STI Holdings, Inc., Stoughton, WI (US)

(72) Inventor: Gary L. Fenton, Edgerton, WI (US)

(73) Assignee: STI Holdings, Inc., Stoughton, WI (US)

( * ) Notice: Subject to any disclaimer, the term of this patent is extended or adjusted under 35 U.S.C. 154(b) by 18 days.

This patent is subject to a terminal disclaimer.

(21) Appl. No.: 16/852,646

(22) Filed: Apr. 20, 2020

(65) Prior Publication Data

US 2020/0239086 A1 Jul. 30, 2020

Related U.S. Application Data

(63) Continuation of application No. 15/962,341, filed on Apr. 25, 2018, now Pat. No. 10,625,790.

(51) Int. Cl.
*B62D 33/04* (2006.01)
*B65D 90/02* (2019.01)
*B65D 90/08* (2006.01)
*B65D 88/12* (2006.01)

(52) U.S. Cl.
CPC ......... *B62D 33/046* (2013.01); *B62D 33/044* (2013.01); *B65D 88/12* (2013.01); *B65D 90/026* (2013.01); *B65D 90/08* (2013.01)

(58) Field of Classification Search
CPC .... B62D 33/046; B62D 33/044; B65D 88/12; B65D 90/026; B65D 90/08

USPC ...................................................... 296/186.1
See application file for complete search history.

(56) References Cited

U.S. PATENT DOCUMENTS

| | | |
|---|---|---|
| 3,028,192 A | 4/1962 | Jewell |
| 4,425,001 A | 1/1984 | Mauri |
| 5,052,741 A | 10/1991 | Brown et al. |
| 5,584,527 A | 12/1996 | Sitter |
| 6,793,271 B1 | 9/2004 | Deets |
| 6,959,959 B1 | 11/2005 | Roush |
| 7,401,844 B2 | 7/2008 | Lemmons |
| 7,407,218 B1 | 8/2008 | Pishock, Jr. et al. |
| 7,494,177 B2 | 2/2009 | Henning |
| 7,527,325 B2 | 5/2009 | Yurgevich |
| 7,690,719 B2 | 4/2010 | Goff et al. |
| 7,722,122 B2 | 5/2010 | Mittelstadt |

(Continued)

*Primary Examiner* — Joseph D. Pape
(74) *Attorney, Agent, or Firm* — Michael Best & Friedrich LLP

(57) ABSTRACT

A container including a first panel with a first edge having a first protrusion with a first contoured profile with at least one projection, a second panel with a second edge having a second protrusion with a second contoured profile with at least one projection, and a spline with a first channel that defines a recess with an interior profile, and a second channel separate from the first channel that defines a recess with an interior profile. The first and second channels receive the first and second protrusions, respectively, such that the first contoured profile is complementary to a portion of the interior profile and the second contoured profile is complementary to a portion of the interior profile. The first and second panel include a mid-section extending from the first and second edges, respectively. The first and second edges have a greater thickness than the thickness of the mid-sections.

20 Claims, 11 Drawing Sheets

(56) References Cited

U.S. PATENT DOCUMENTS

| | | |
|---|---|---|
| 7,819,464 B2 | 10/2010 | Haub et al. |
| 8,056,960 B2 | 11/2011 | Brown |
| 8,342,598 B2 | 1/2013 | Stanton |
| 8,424,958 B2 | 4/2013 | Wylezinski et al. |
| 8,540,099 B2 | 9/2013 | Roush |
| 8,998,295 B2 | 4/2015 | Katz et al. |
| 9,067,729 B2 | 6/2015 | Fenton |
| 9,242,591 B2 | 1/2016 | Ehrlich |
| 2002/0101095 A1 | 8/2002 | Gosselin et al. |
| 2002/0109377 A1 | 8/2002 | Ehrlich |
| 2004/0012227 A1 | 1/2004 | Robinson |
| 2006/0059791 A1 | 3/2006 | Conny et al. |
| 2013/0125491 A1 | 5/2013 | Griffin et al. |
| 2014/0054916 A1 | 2/2014 | Knudtson et al. |
| 2016/0039476 A1 | 2/2016 | Kunkel |

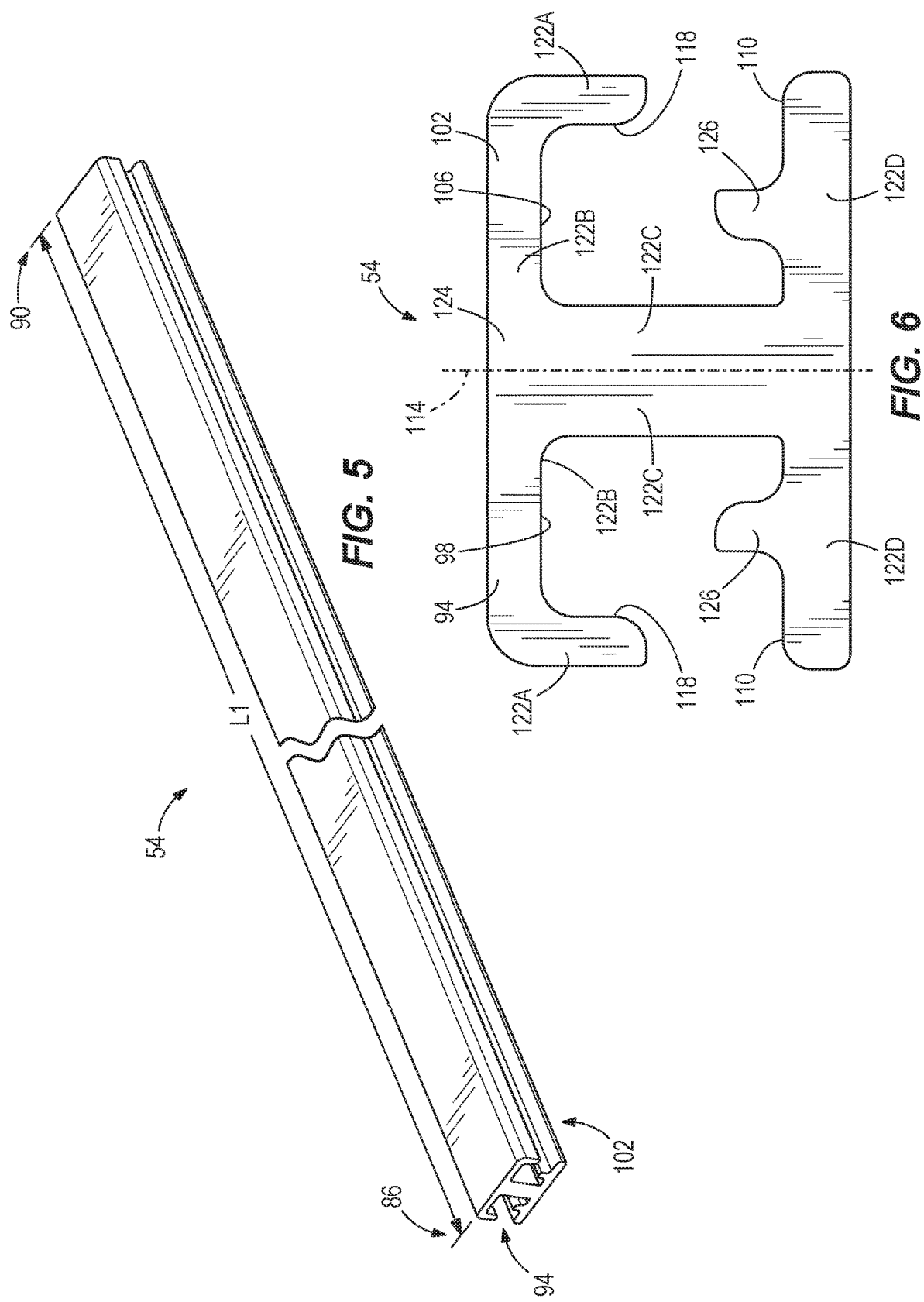

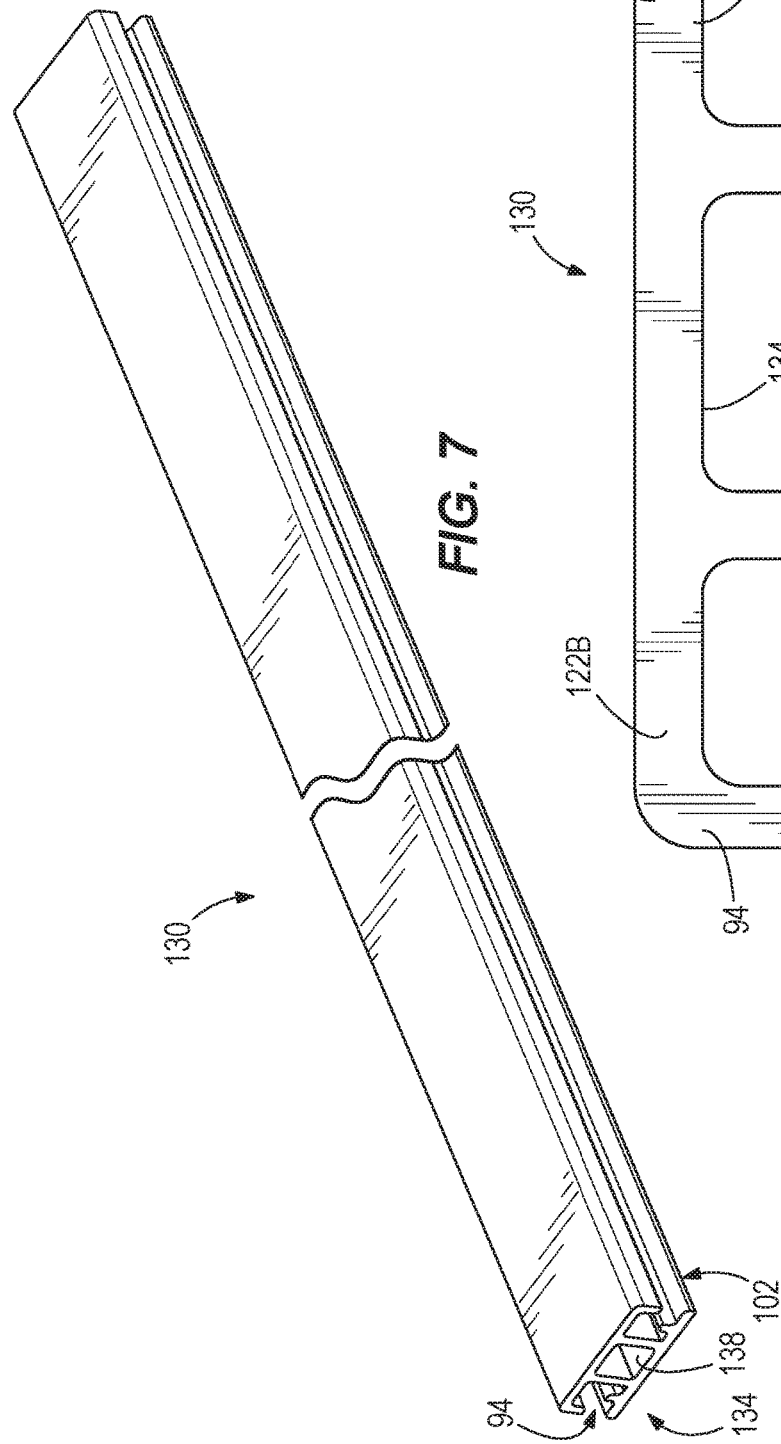
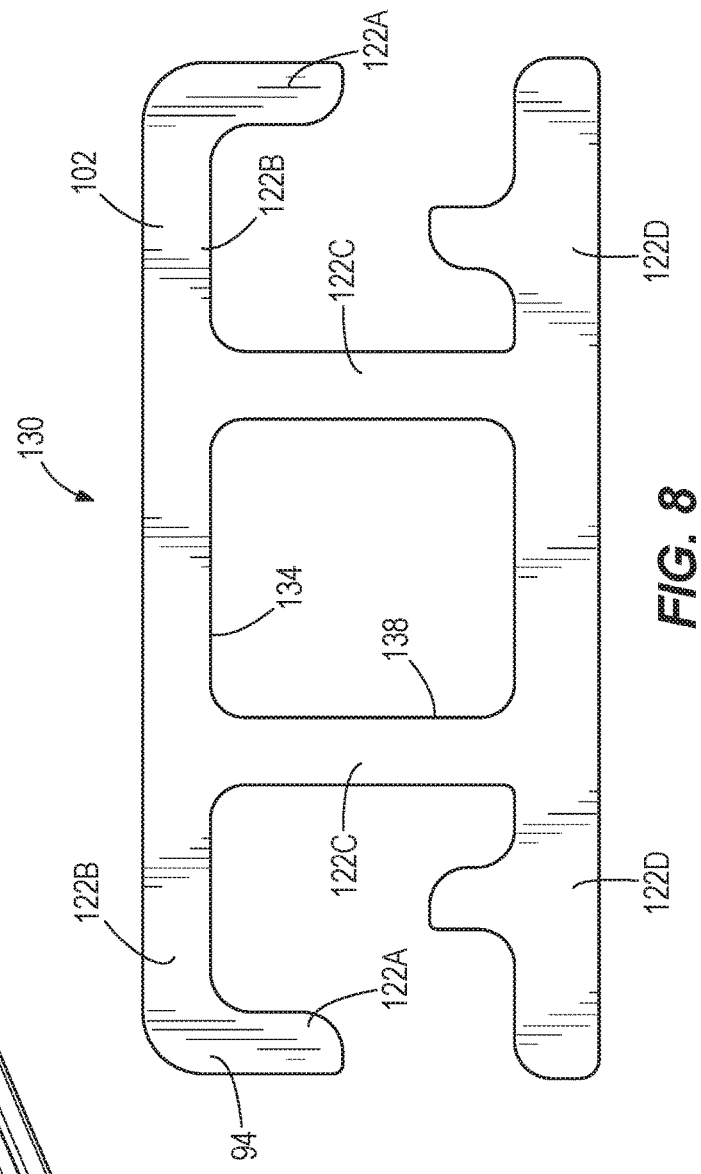

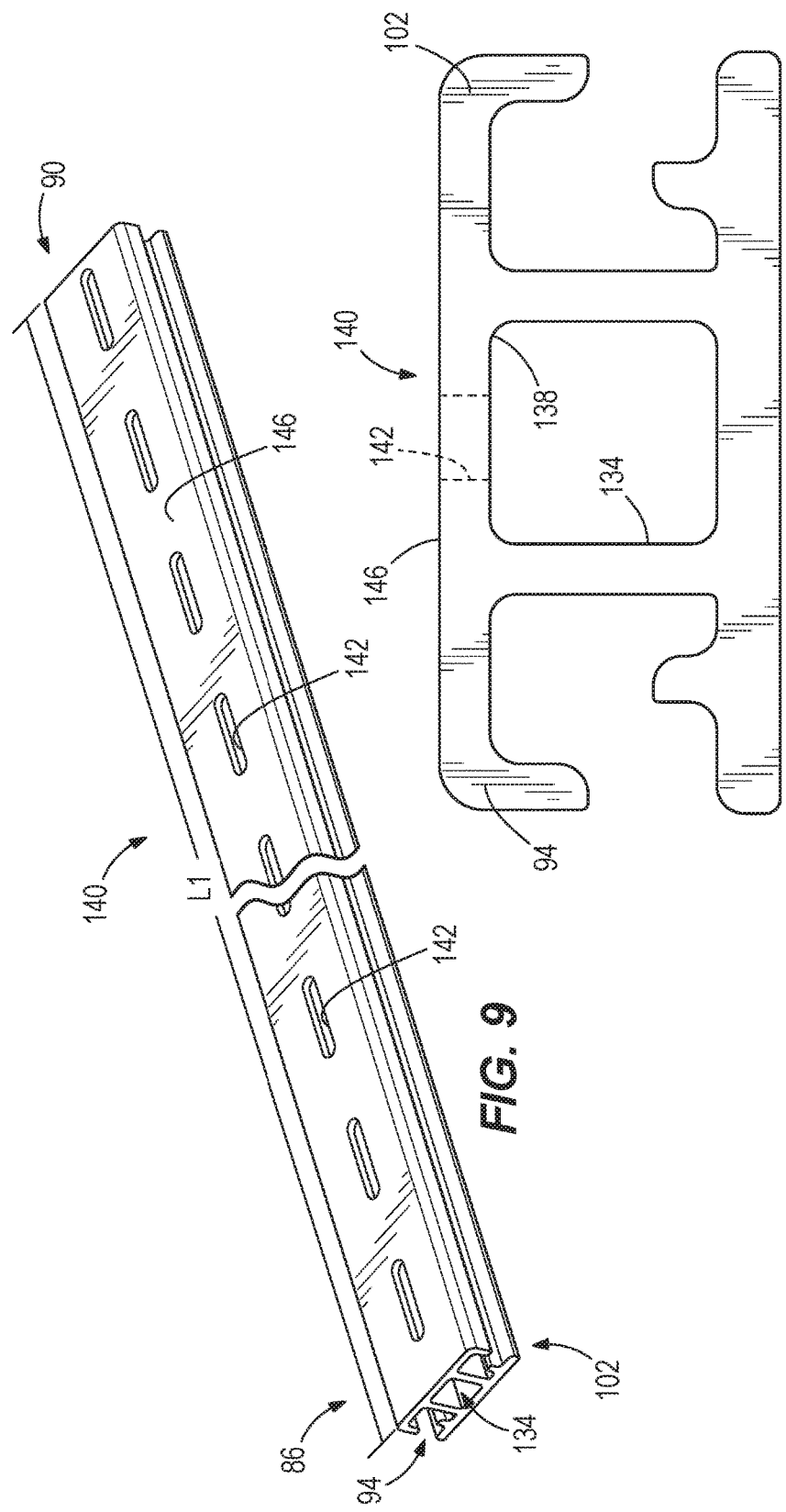

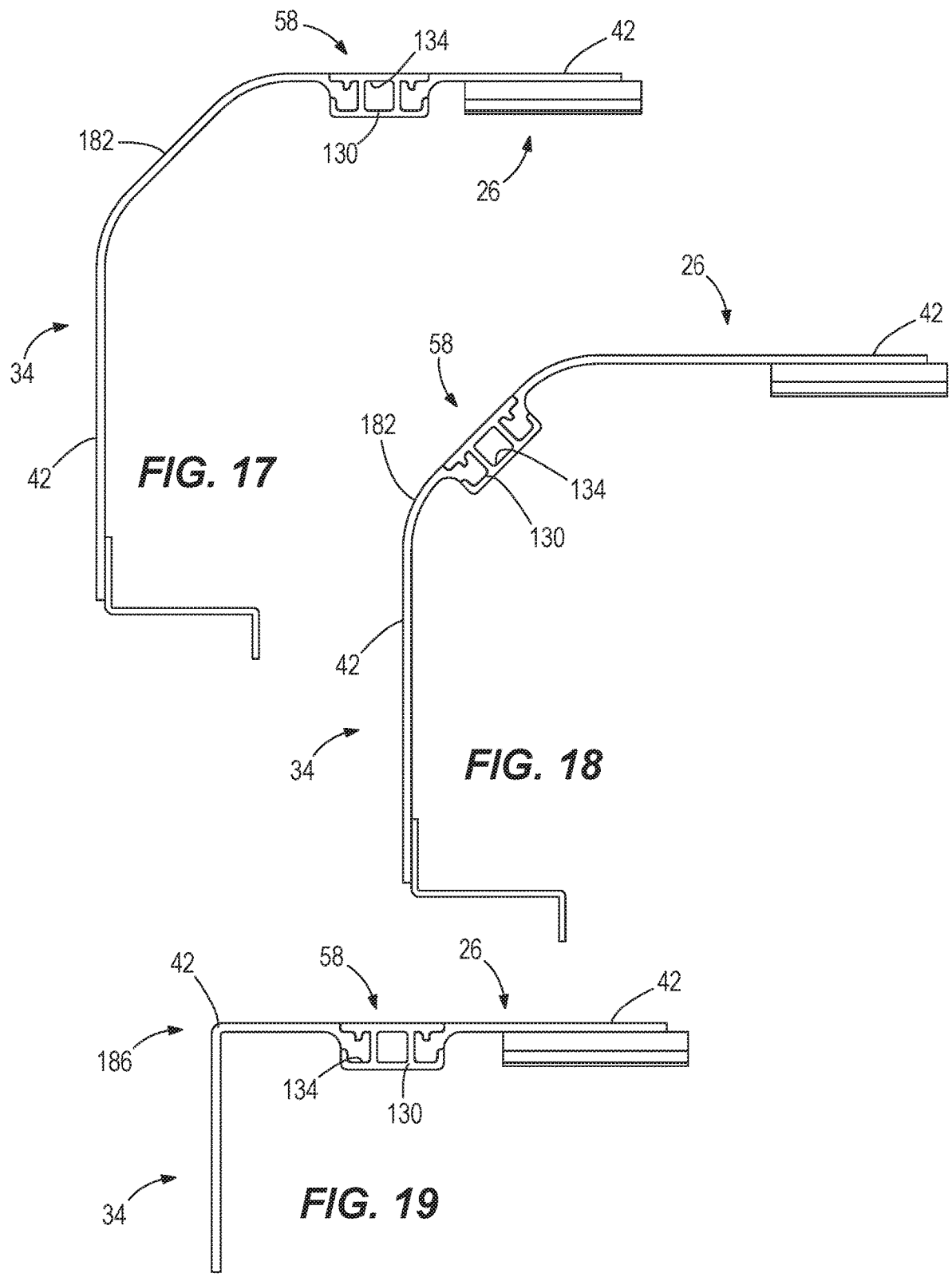

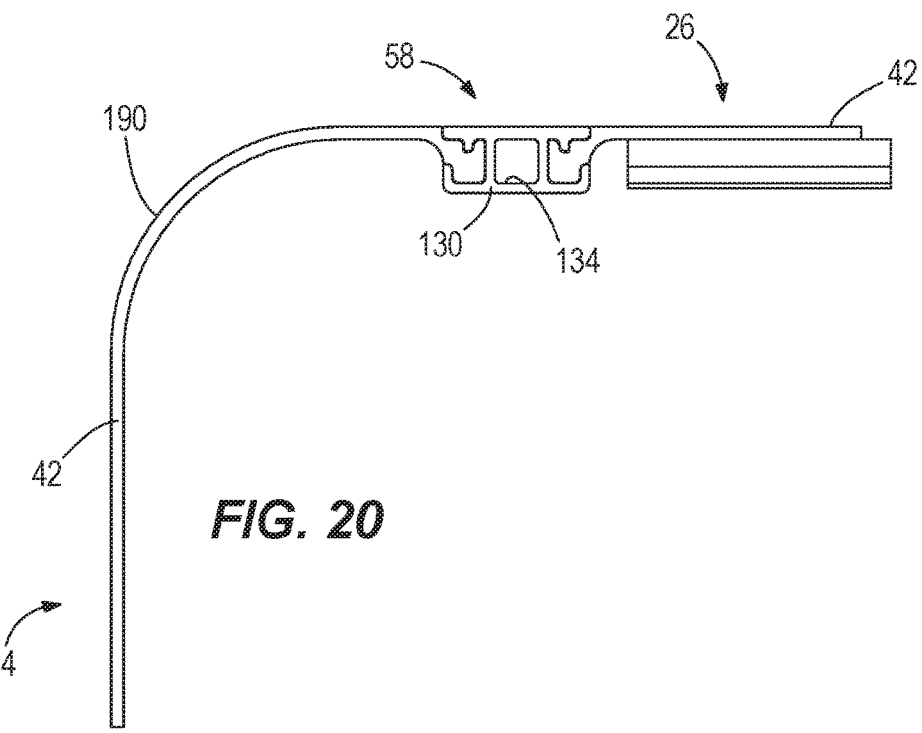
FIG. 20
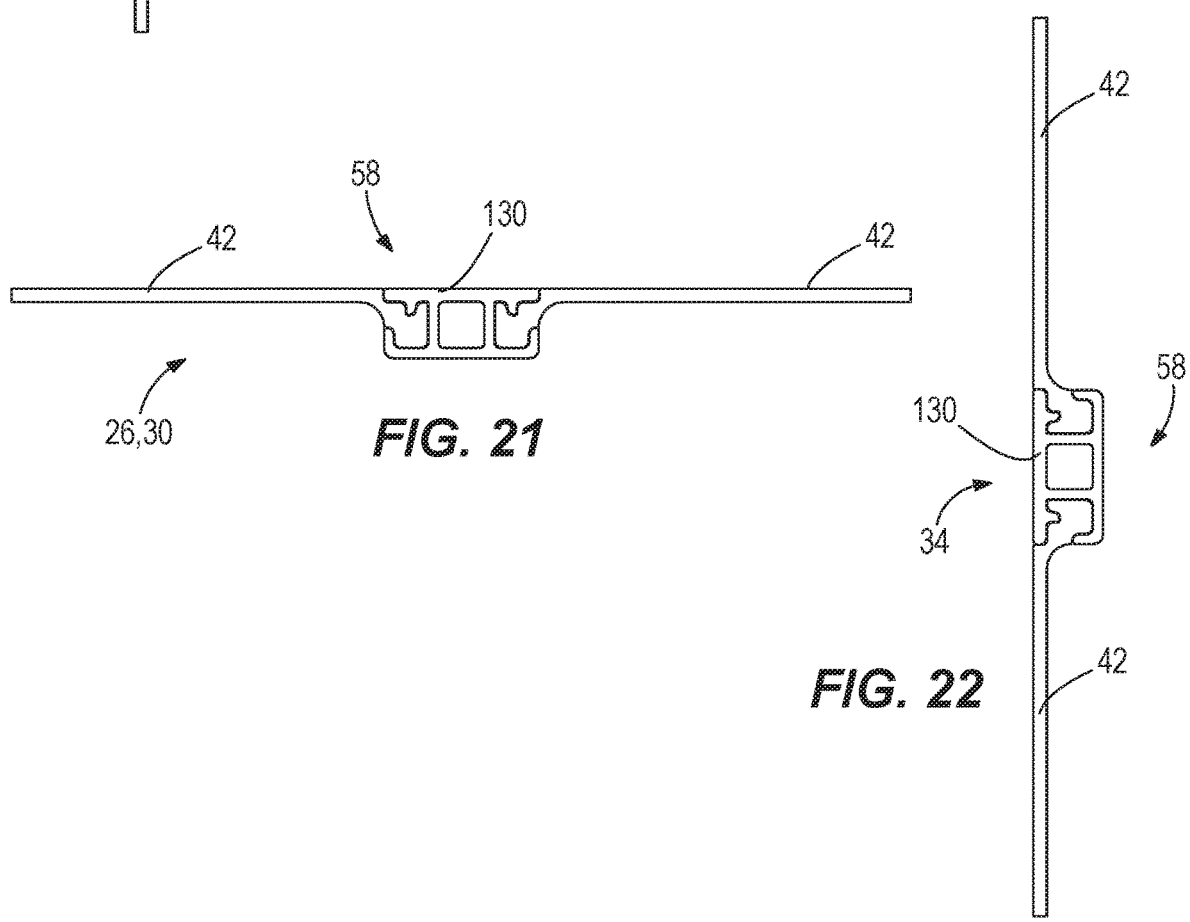
FIG. 21
FIG. 22

SPLINE JOINTS AND CONTAINER HAVING SAME

RELATED APPLICATIONS

This application is a continuation of U.S. application Ser. No. 15/962,341, filed Apr. 25, 2018, the entire contents of which are hereby incorporated by reference.

FIELD OF THE INVENTION

The present invention relates to containers, and in particular, to joints for connecting wall panels of containers.

BACKGROUND

Containers, for example commercial containers transported by trucks, commercial nautical vessels, trains, and the like include a set of walls that enclose the space of the container. The walls and connections therebetween are typically formed by assembling respective wall panels together forming a joint, often including additional splice plates, and then fastening the joints with numerous fasteners such as screws or rivets.

SUMMARY

In one aspect, the invention provides a container defining a cargo receiving interior defined by a plurality of panels. The container includes a first panel having a first edge. The first edge including a first protrusion with a first contoured profile. The first contoured profile includes at least one projection. The container also includes a second panel with a second edge. The second edge includes a second protrusion with a second contoured profile. The contoured profile includes at least one projection. The container further includes a spline having a first channel that defines a recess with an interior profile and a second channel separate from the first channel that defines a recess with an interior profile. The first channel receives the first protrusion of the first panel such that the first contoured profile is complementary to a portion of the interior profile. The second channel receives the second protrusion of the second panel such that the second contoured profile is complementary to a portion of the interior profile. The first panel further includes a mid-section extending from the first edge and the second panel further includes a mid-section extending from the second edge. The first edge has a greater thickness than the thickness of the mid-section of the first panel and the second edge has a greater thickness than the thickness of the mid-section of the second panel.

In another aspect, the invention provides a container defining a cargo receiving interior defined by a plurality of panels. The container including a first contoured edge of a first panel, a second contoured edge of a second panel, and a spline with a first channel that receives the first contoured edge and a second channel that receives the second contoured edge to form a spline joint securing the first and second panels together. The first and second channels are symmetrical with openings in opposite directions. Each of the first and second contoured edges includes a concavity containing an adhesive that bonds a surface of the respective first and second contoured edges with a surface of respective first and second channels of the spline.

In another aspect, the invention provides a method of assembling a container. The container defines a cargo receiving interior defined by a plurality of panels. The method includes providing a first panel with a first contoured edge and a second panel with a second contoured edge. The first panel and the second panel are held fixed relative to each other to define a space between the first and second contoured edges. The method also includes providing a spline with two symmetrical channels that open in opposite directions and sliding the spline axially and simultaneously onto the first and second contoured edges and into the space therebetween so that a first one of the two symmetrical channels receives the first contoured edge and a second one of the two symmetrical channels receives the second contoured edge to from a spline joint securing the first panel to the second panel. The method further includes, after the first and second panels are secured, applying an adhesive to a concavity on the first contoured edge to bond a surface of the first contoured edge with a surface of one of the two symmetrical channels, and applying an adhesive to a concavity on the second contoured edge to bond a surface of the second contoured edge with a surface of the other of the two symmetrical channels after the first and second panels are secured.

In another aspect, the invention provides a container defining a cargo receiving interior defined by a plurality of panels. The container includes a first panel having a first edge. The first edge including a first protrusion with a first contoured profile. The first contoured profile includes at least one projection. The container also includes a second panel with a second edge. The second edge includes a second protrusion with a second contoured profile. The contoured profile includes at least one projection. The container further includes a spline having a first channel that defines a recess with an interior profile and a second channel separate from the first channel that defines a recess with an interior profile. The first channel receives the first protrusion of the first panel such that the first contoured profile is complementary to a portion of the interior profile. The second channel receives the second protrusion of the second panel such that the second contoured profile is complementary to a portion of the interior profile. Each of the first and second contoured profiles includes a concavity containing an adhesive that bonds a surface of the respective first and second contoured profiles with a surface of the interior profile of the respective first and second channels of the spline.

Other aspects of the invention will become apparent by consideration of the detailed description and accompanying drawings.

BRIEF DESCRIPTION OF THE DRAWINGS

FIG. 5 is a perspective view of a spline according to one embodiment of the invention.

FIG. 6 is a top view of the spline of FIG. 5.

FIG. 7 is a perspective view of a spline according to another embodiment of the invention.

FIG. 8 is a top view of the spline of FIG. 7.

FIG. 9 is a perspective view of a spline according to another embodiment of the invention.

FIG. 10 is a top view of the spline of FIG. 9.

FIG. 11 is a side view of the spline of FIG. 9.

FIG. 17 is a top view of a spline joint according to another embodiment of the invention.

FIG. 18 is a top view of a spline joint according to another embodiment of the invention.

FIG. 19 is a top view of a spline joint according to another embodiment of the invention.

FIG. 20 is a top view of a spline joint according to another embodiment of the invention.

FIG. 21 is a top view of a spline joint according to another embodiment of the invention.

FIG. 22 is a top view of a spline joint according to another embodiment of the invention.

DETAILED DESCRIPTION

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. It should be understood that the description of specific embodiments is not intended to limit the disclosure from covering all modifications, equivalents, and alternatives falling within the spirit and scope of the disclosure. Also, it is to be understood that the phraseology and terminology used herein is for the purpose of description and should not be regarded as limiting.

The term "laterally" or variations thereof refer to a sideways direction. The terms "top," "upper," "bottom," and "lower" are intended to indicate directions when viewing the container when positioned for use. The term "coupled" means connected to or engage with, whether either directly or indirectly, for example with an intervening member, and does not require the engagement to be fixed or permanent, although engagement can be fixed or permanent. It should be understood that the use of numerical terms "first," "second," "third," etc. as used herein does not refer to any particular sequence or order of components; for example, "first" and "second" portions may refer to any sequence of such components, and is not limited to the first and second components of a particular configuration.

Figure 1:
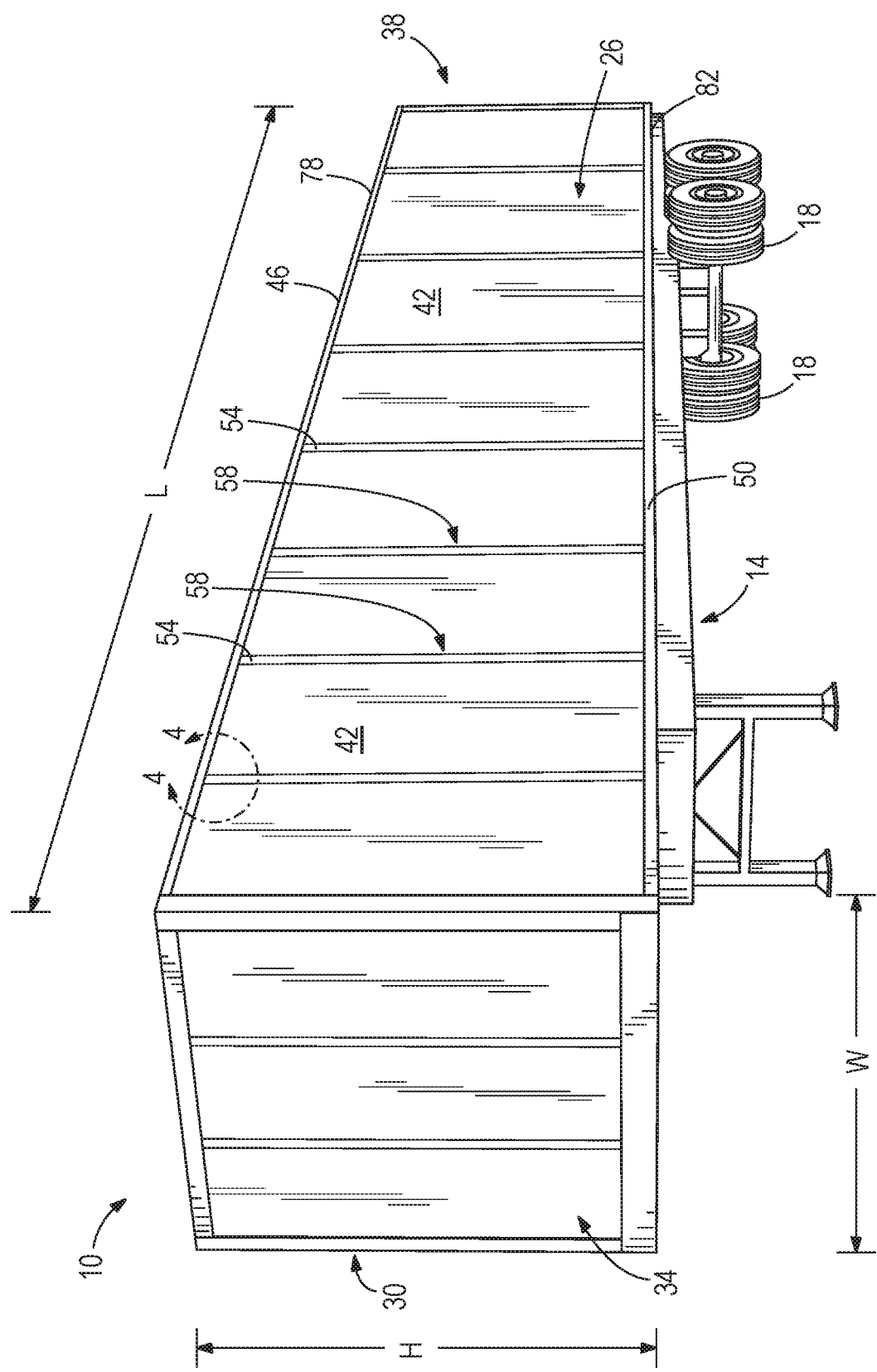
FIG. 1 is a first perspective view of a container.
Figure 2:
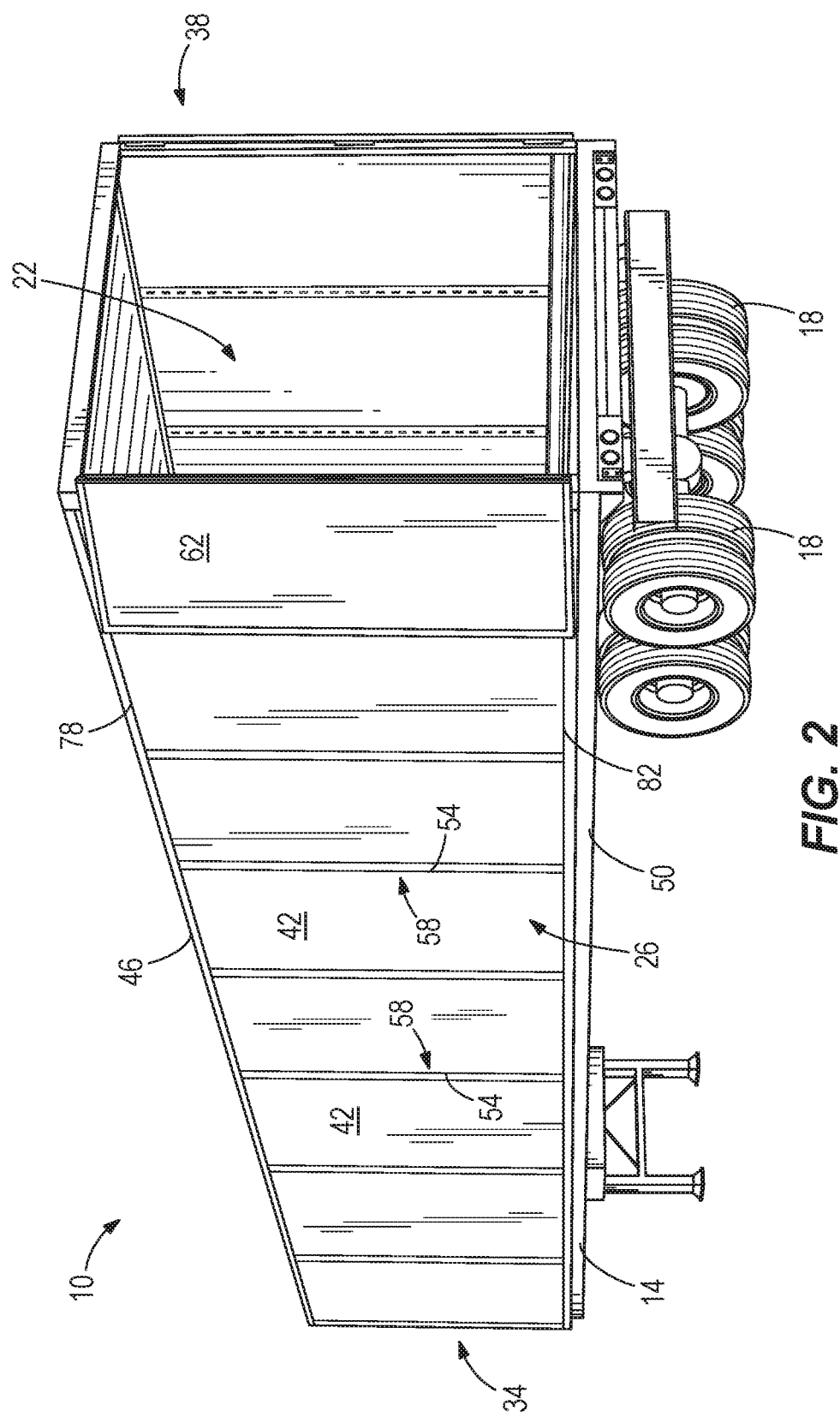
FIG. 2 is a second perspective view of the container of FIG. 1.

FIGS. 1 and 2 illustrate a container, embodied here as a trailer 10 for over-the-road use with a truck to transport large cargo volumes. In other embodiments, the container may be a fixed storage construction, a cargo container, a shipping container, a straight truck, or the like. As shown, the trailer 10 is a semi-trailer configured for use with a road tractor (i.e., in forming a so called 18-wheeler). Aspects of the invention are not necessarily limited to such a trailer 10, and aspects of the disclosure will be understood as also applying to other trailers and containers of various configurations. The trailer 10 includes a chassis 14 having axles with multiple sets of wheels 18, although similar containers may be provided with alternate rolling chassis configurations or none at all. The trailer 10 defines a length L in a longitudinal or transport direction. The length L can be 53 feet in some constructions, although the trailer 10 can be manufactured in other lengths greater than or less than 53 feet. Perpendicular to the longitudinal direction, the trailer 10 defines a width W and a height H. The width W cooperates with the length L to define a plan view footprint of the trailer 10, while the height H of the trailer 10 is measured perpendicular to the footprint (i.e., perpendicular to the ground). Subtracting for wall thicknesses, the length L, the width W, and the height H cooperate to define a cargo receiving interior 22 (FIG. 2) of the trailer 10.

Figure 4:
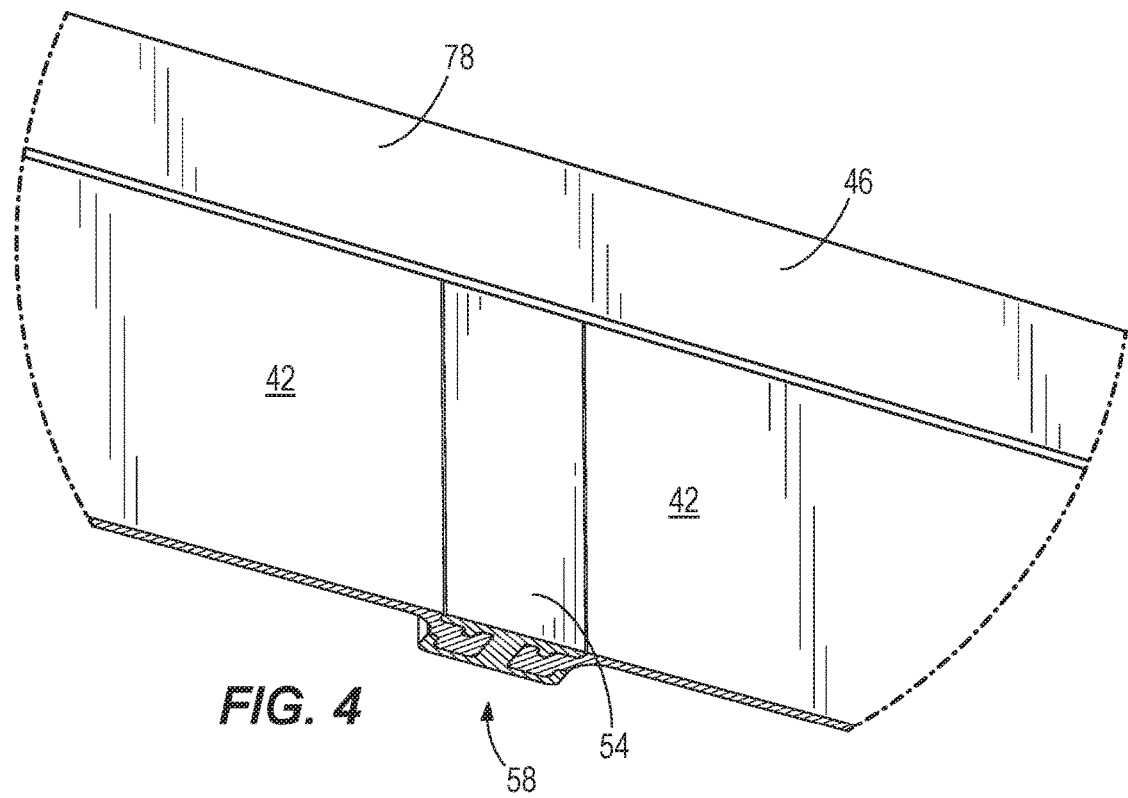
FIG. 4 is a perspective view of a spline joint on the container of FIG. 1

The trailer 10 includes a first side defined by a first side wall 26, a second side defined by a second side wall 30 opposite the first side wall 26, a front defined by a front wall 34, and a rear 38. Wall panels 42 may form walls that span the first side wall 26, second side wall 30, and front wall 34. Each of the first side wall 26, second side wall 30, and front wall 34 can be constructed of one or more wall panels 42. Further in some embodiments, a wall panel may wrap around a corner of the trailer and form parts of multiple walls (e.g., the front wall and one of the first and second side walls). All of the wall panels 42 extend between a roof 46 of the trailer 10 and a floor 50 of the trailer 10. Consecutive wall panels 42 can be joined together by a spline 54 forming a joint (e.g., spline joint 58, FIG. 4) that extends parallel to the direction of the height H of the trailer 10 between the roof 46 and floor 50 of the trailer 10. As shown in FIG. 2, the rear 38 of the trailer 10 includes at least one door panel 62 provided to selectively open for accessing the interior 22 for loading and unloading.

Figure 3:
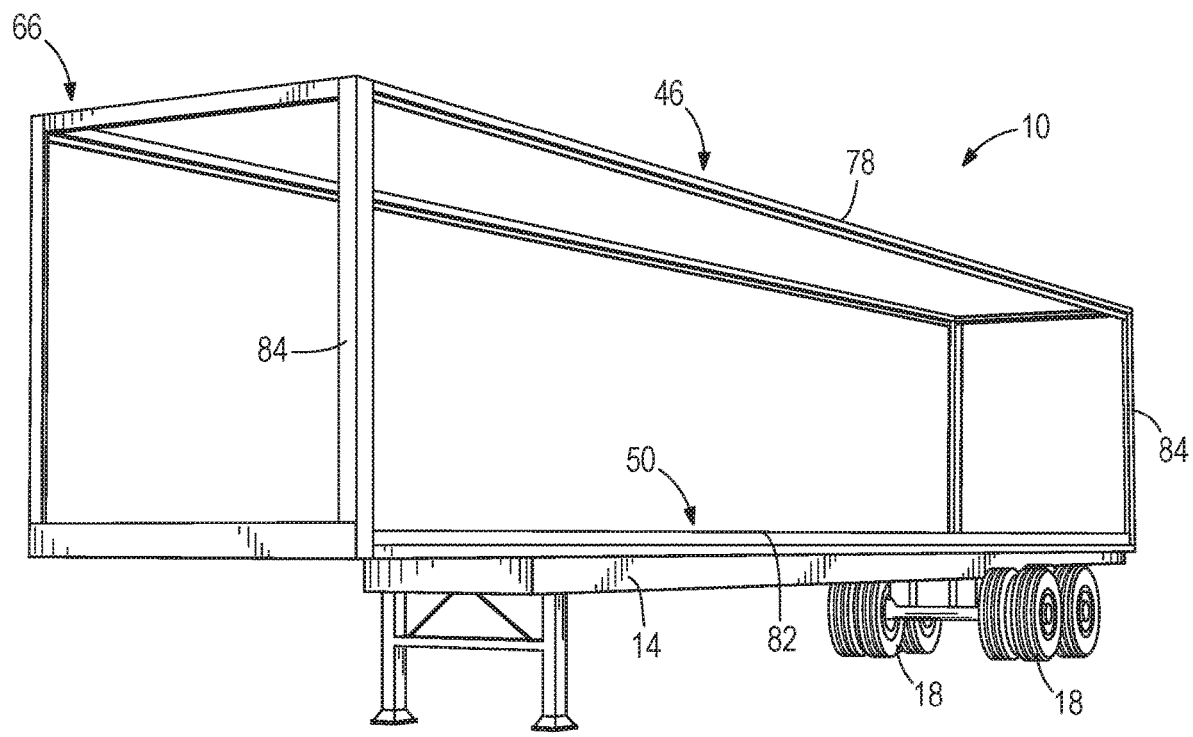
FIG. 3 is a perspective view of the container of FIG. 1 without walls.

As shown in FIG. 3, the trailer 10 includes a frame 66 including, on each side, a top rail 78 adjacent the roof 46, a bottom rail 82 adjacent the floor 50, and support posts 84. The top rail 78 and the bottom rail 82 extend parallel to the longitudinal or lengthwise direction of the trailer 10. The support posts 84 are positioned perpendicular to the longitudinal direction and spaced along the length L of the trailer 10.

With reference to FIGS. 5 and 6, the spline 54 includes a first end 86, a second end 90 opposite the first end 86, and a length L1 between the first and second ends 86, 90. The length L1 of the spline 54 defines the length of the spline joint 58. The spline 54 also includes a first channel 94 that defines a first recess 98 and a second channel 102 that defines a second recess 106. Each of the first and second channels 94, 102 is formed as an open-channel or structure and the first and second channels 94, 102 forming the spline 54 can be integrally formed as a single piece or separately formed and joined together. The first and second channels 94, 102 both have openings 110 to their respective recesses 98, 106 that open in opposite directions of one another. The first and second channels 94, 102 are also symmetrical about an axis 114 that extends through the center of the spline 54. Each of the first and second recesses 98, 106 includes a respective interior profile 118 that spans the inside of their respective channels 94, 102. The interior profiles 118 are defined along four sides 122A-D that form a rectangular arrangement with adjacent sides 122A-D being perpendicular to one another. The two directly adjacent sides 122C of the respective first and second channels 94, 102 cooperatively form a web 124 of the spline 54 that extends between, on one end of the web 124, the sides 122C arranged toward the interior and, on the other end of the web 124, the sides 122D arranged toward the exterior. Although referred to herein as individual sides, the two sides 122C are arranged in the illustrated construction to be coextensive, forming one side of the spline 54 as a whole, and the same may be said of the two sides 122D. For example, the spline 54 may be viewed as having a modified I-beam shape, where the web 124 extends between the midsections of two parallel, spaced sides.

Each of the interior profiles 118 of the spline 54 includes a male projection 126 that extends from one side (e.g., the exterior side 122D) of the channel 94, 102 into the open space that otherwise forms the female recess 98, 106. As illustrated, each projection 126 extends perpendicularly from the side 122D. In the case that the projections 126 extend from the exterior sides 122D in both channels 94, 102, this means that the projections 126 extend in a direction toward the interior of the trailer 10. As shown in FIG. 6, one side of each projection 126 is flat while another side (e.g., an opposite side) is curved. As shown, the two projections 126 of the spline 54 are arranged so that the two curved sides are facing each other and the two flat sides are facing away from each other. Although the interior profiles 118 are shown to include exactly one pair of mirror-image projections 126, one or both of the interior profiles 118 can alternately include more or fewer projections 126. Further, the projections 126 are not mirror-images in other constructions, and each projection 126 can have any convenient number of flat and/or round sides. In further embodiments, each interior profile 118 may include more or less than the four sides as illustrated, and the sides of the interior profiles may differ in shape from that shown.

FIGS. 7 and 8 illustrate a spline 130 according to another embodiment. The spline 130 is similar to the spline 54, with like features being represented by like reference numerals. The spline 130 includes an additional channel 134 (e.g., a central channel 134) that extends the length L1 of the spline 130 at a position between the first and second channels 94, 102. The central channel 134 can be positioned exactly centrally within the spline 130, or offset therefrom. Although the central channel 134 has a regular, symmetrical shape, alternate shapes are optional. The central channel 134 is defined between the separate, spaced apart sides 122C of the first channel 94 and the second channel 102. These two sides 122C form parallel webs that bound the central channel 134. The central channel 134 defines an interior 138 that is rectangular, notwithstanding the rounded corners, and is positioned between the first and second channels 94, 102.

FIGS. 9-11, illustrate a spline 140 according to another embodiment. The spline 140 is similar to the splines 54, 130 with like features being represented by like reference numerals. The spline 140 includes the central channel 134 and a plurality of slots 142 (e.g., logistic slots) that extend into the interior 138 of the central channel 134 through an interior-facing wall 146 of the spline 140. The slots 142 extend the entire length L1 of the spline 140 from the first end 86 to the second end 90 of the spline 140. The slots 142 may take any number of different shapes, including the simple elongate holes as illustrated. When a spline joint 58 including a spline 140 is assembled, the logistic slots 142 are exposed to the interior 22 of the trailer 10 so as to provide attachment points for load separators or other restraints that may be secured to the interior 22 of the trailer 10.

Figure 12:
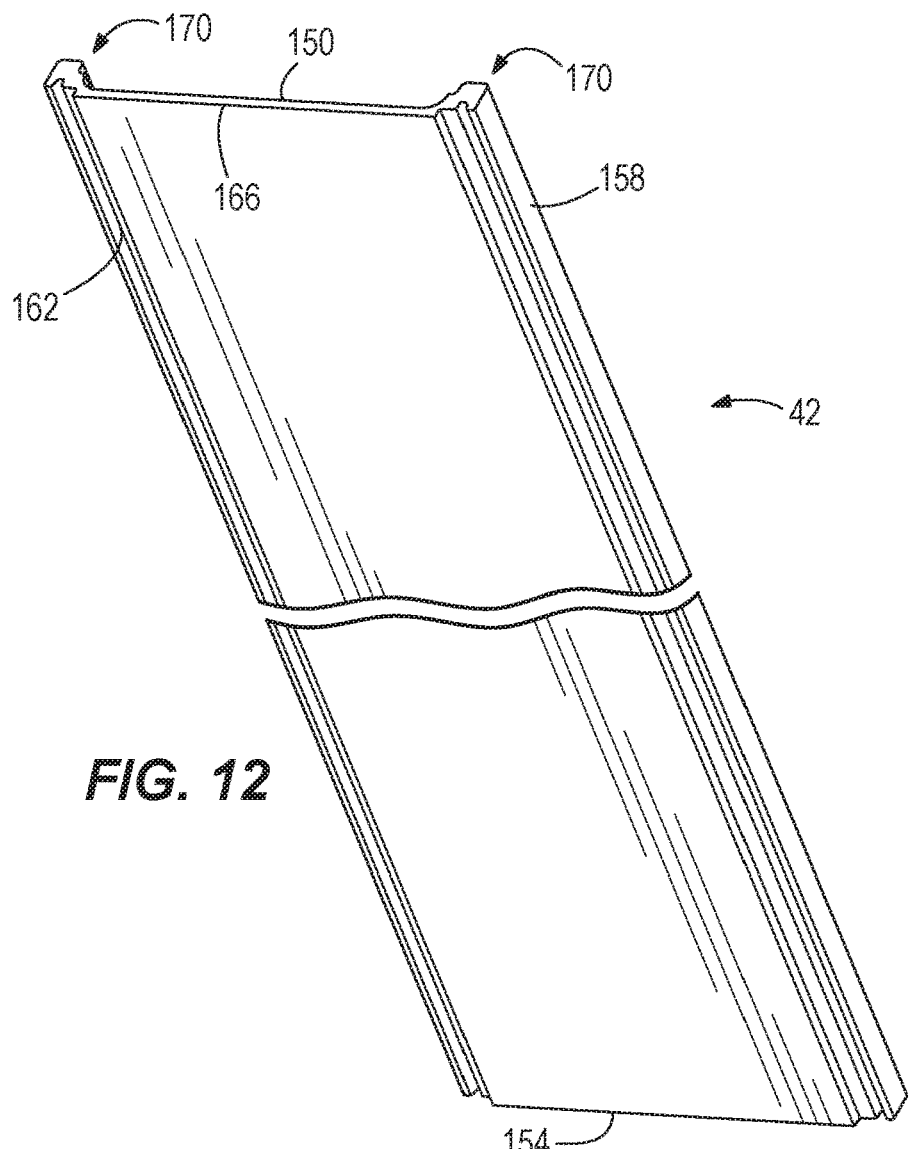
FIG. 12 is a perspective view of a wall panel of the container of FIG. 1.
Figure 13:
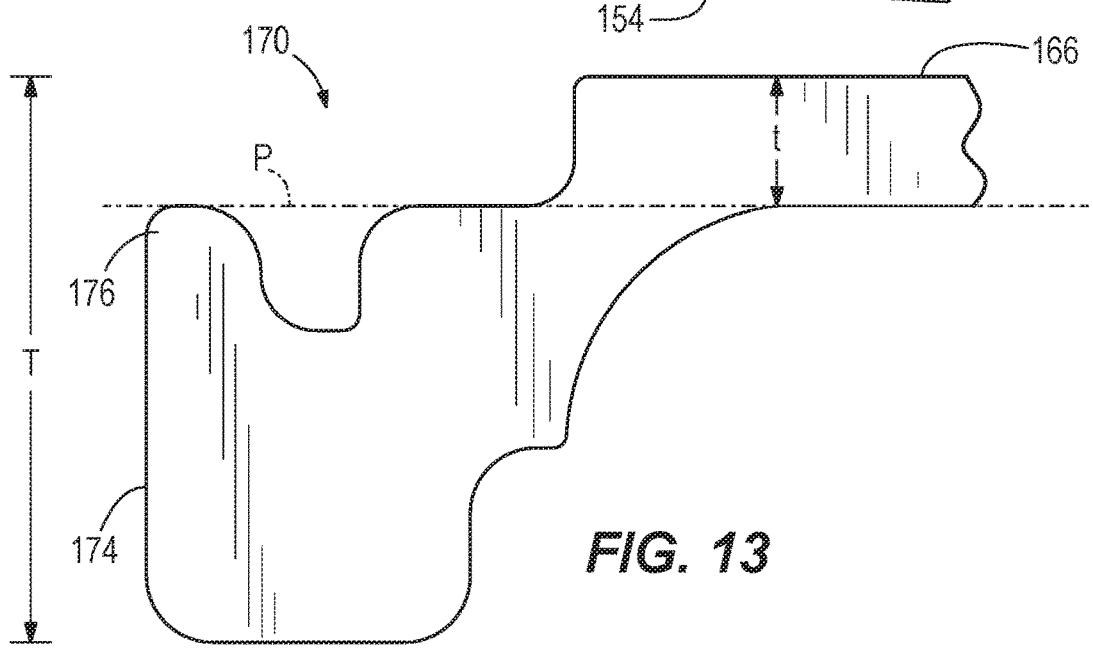
FIG. 13 is a detail view of a side edge of the wall panel of FIG. 12 according to one embodiment of the invention.

Referring to FIG. 12, some or all of the wall panels 42 of the trailer 10 include a top edge 150, a bottom edge 154 opposite the top edge 150, a first side edge 158 (right), a second side edge 162 (left) opposite the first side edge 158, and a mid-section 166 spanning between the first and second side edges 158, 162. In the illustrated embodiment, the first and second side edges 158, 162 extend the entire length of the wall panels 42 from the bottom edge 154 to the top edge 150. In other embodiments, the first and second side edges 158, 162 only extend a majority portion of the length between the top and bottom edges 150, 154. Referring now to FIG. 13, the first and second side edges 158, 162 of any respective wall panel 42 are oblong shaped and include a protrusion 170 that extends towards the interior 22 of the trailer 10 when the wall panel 42 is positioned for use. In other words, the protrusion 170 is offset inwards from a plane P that is defined by an interior surface of the wall panel 42 at a location (e.g., the mid-section 166) along the wall panel 42 that is spaced away from the protrusion 170. Each of the protrusions 170 on respective first and second side edges 158, 162 of the wall 42 include a contoured profile 174. In other words, the contoured profiles 174 are irregularly shaped and not strictly defined by flat or straight ends. The contoured profile 174 includes a projection 176 that extends towards the plane P (e.g., extending toward the exterior when assembled for use). In the illustrated embodiment, the contoured profile 174 of the protrusion 170 on the first side edge 158 of the wall panel 42 corresponds to the interior profile 118 of the first channel 94 of the spline 54 and the contoured profile 174 of the protrusion 170 on the second side edge 162 of the wall panel 42 corresponds to the interior profile 118 of the second channel 102 of the spline 54. The protrusion 170 on the first edge 158 of the wall 42 is complementary in shape to the first channel 94, and the protrusion 170 on the second edge 162 of the wall panel 42 is complementary in shape to the second channel 102 of the spline 54. Although in the illustrated embodiment, the contoured profiles 174 are mirror-images of one another, each including a single projection 176, the contoured profiles 174 are, in some constructions, different from each other and either one or both may differ in shape from that shown herein, e.g., the contoured profile 174 may include more or fewer projections 176 or projections 176 of alternate shapes. It is noted here that the projections 176 as shown, similar to the spline projections 126, include one flat side and one curved side opposite the flat side. In some embodiments, the contoured profiles 174 may correspond (e.g., form fit) to the interior profiles 118 of the channels 94, 102. In further embodiments, the contoured profile 174 may be complementary in shape to only a portion(s) of the shape of the interior profiles 118 of the spline 54. In other embodiments, the contoured profiles 174 may be entirely complementary in shape to the interior profiles 118 of the spline 54. In other words, the contoured profiles 174 may fully occupy the space provided by the recesses 98, 106 of the spline 54 with no void space. However, some gaps between the contoured profiles 174 and the interior profiles 118 may exist due to manufacturing tolerances or assembly clearances but the general shapes of the interior profiles 118 and contoured profiles do not vary. The first and second side edges 158, 162 of the wall panels 42 have a thickness T that is greater than the thickness t of the mid-section 166 of the wall panels 42 when measured in a common direction, i.e., the direction transverse to a direction of extension, or width, of the wall panel 42 between the respective first and second side edges 158, 162.

As discussed earlier, the wall panels 42 can span along the side walls 26, 30, and front wall 34 of the trailer 10, or a wall panel 42 can span the entire length of one of the side walls 26, 30, or front wall 34 of the trailer 10. As such, the length between the first and second side edges 158, 162 of the wall panels 42 can vary significantly, along with the resulting aspect ratio of length to width. The thicknesses T, t may also vary as needed, based on construction material and strength requirements. In some embodiments, the first and second side edges 158, 162 of the wall panels 42 may be reinforced with a coating. In some embodiments, the wall panels 42 may be made out of a composite material. In further embodiments, the wall panels 42 may be made out of a sheet metal material such as aluminum.

Figure 14:
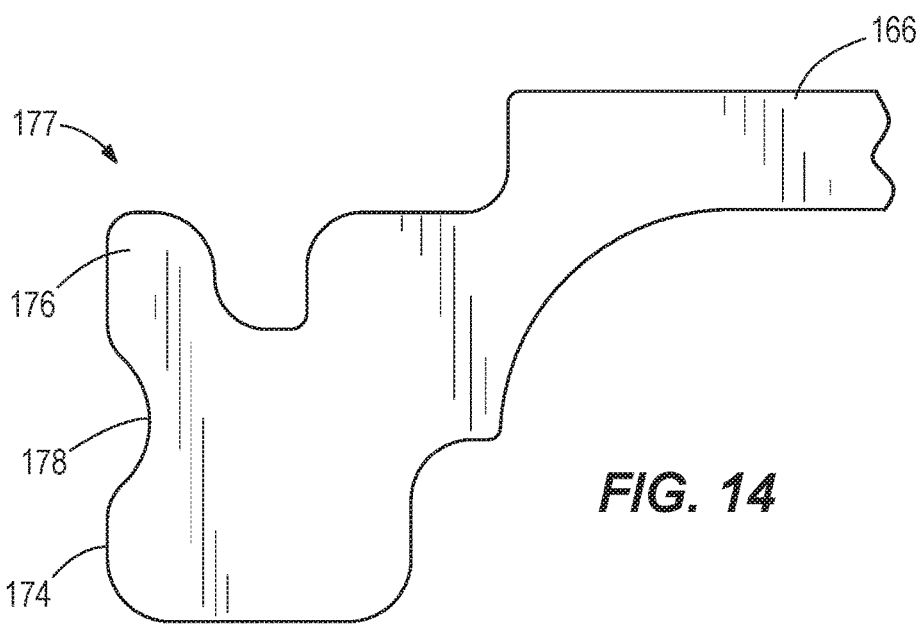
FIG. 14 is a detail view of a side edge of the wall panel of FIG. 12 according to another embodiment of the invention.

FIG. 14 illustrates an alternate protrusion 177 for the first and second side edges 158, 162 of the wall panels 42 according to the preceding description. The protrusion 177 is similar to the protrusion 170, with like features being represented by like reference numerals. However, the protrusion 177 of FIG. 14 further includes an additional concavity 178. The concavity 178 extends the entire length of the first and second side edges 158, 162. The concavity 178 provides a volume and a surface for an adhesive to be applied between the spline 54 and the respective side edges 158, 162. The adhesive may be applied along the surface of the concavity 178 to bond the first and second side edges 158, 162 to the first and second channels 94, 102 of the spline 54, respectively.

To assemble one of the spline joints 58 according to the present disclosure, the spline 54 is installed axially or lengthwise onto the two side edges 158, 162 of respective wall panels 42 being joined. Although reference is made directly to the spline 54 in the discussion of the assembly, it will be appreciated that the discussion also applies to splines of any number of alternate constructions, such as splines 130, 140. Before the spline 54 is installed, a first side edge 158 of a respective first wall panel 42 is positioned parallel to a second side edge 162 of a respective second wall panel 42. The first side edge 158 and the second side edge 162 are positionally fixed relative to each other to define a space therebetween, which space corresponds directly to the spacing between the channels 94, 102 of the spline 54. Next, the spline 54 is arranged such that the first channel 94 is positioned above and aligned with the first side edge 158 of the first wall panel 42, and the second channel 102 is positioned above and aligned with the second side edge 162 of the second wall panel 42. The spline 54 is then moved axially in a direction parallel to its lengthwise direction into the space between the two wall panels 42 such that the contoured profiles 174 of the first and second side edges 158, 162 align with and slide into engagement with the interior profiles 118 of the first and second channels 94, 102 of the spline 54. In some constructions, the spline joints 58 are established with the wall panels 42 in their final position within the trailer 10, in which case the spline 54 is installed parallel to the trailer height H direction. During lengthwise installation of the spline 54, the projections 126 on the interior profiles 118 of the first and second channels 94, 102 are aligned with and received by complementary recesses formed in the protrusions 170 along the first and second side edges 158, 162. Furthermore, the projections 176 on the contoured profiles 174 of the first and second side edges 158, 162 are installed to be positioned directly alongside the projections 126. Finally, the spline 54 is slid axially further along the contoured profiles 174 of the first and second protrusions 170 to occupy an entire lengthwise extent of the space therebetween, or a majority thereof. The first wall panel 42 is mechanically secured to the second wall panel 42 immediately upon installation of the spline 54. In the illustrated embodiment, the contoured profile 174 of the first wall panel 42 is entirely complementary to the first interior profile 118 of the first channel 94 and the contoured profile 174 of the second wall panel 42 is entirely complementary to the interior profile 118 of the second channel 102, with the exception of assembly clearances that may exist between the interior profiles of the first and second channels 94, 012 and the contoured profiles 174 of the first and second contoured profiles. Multiple spline joints 58 can then be assembled around the side walls 26, 30, and front wall 34 of the trailer 10 in a similar manner to connect multiple wall panels 42 together. In some constructions, every joint between adjacent pairs of wall panels 42 throughout the entire trailer 10 is made by a spline joint 58 as described herein.

As mentioned above, in some embodiments, the first and second side edges 158, 162 of the wall panels 42 include a concavity 178 in the contoured profile 174. When the spline joint 58 is assembled, the sides 122C of the interior profiles 118 of respective first and second channels 94, 102 close the concavity 178. Once the first wall panel 42 has been secured to the second wall panel 42, adhesive can be applied to the concavities 178 on both the contoured profiles 174. The adhesive fills the concavities 178 for the entire length of the spline 54, or portions thereof, to bond the surface of the concavity 178 with the sides 122A-D of the interior profiles 118. The interior profiles 118 are completely filled and have no voids, although in this construction the protrusions 174 along with the adhesive cooperatively fill the interior profiles 118.

It should be noted that each of the protrusions 170 on the first and second side edges 158, 162 cannot be forced in a direction perpendicular to the length L1 of the spline 54, 130, 140 into the respective first and second channels 94, 102 of the spline 54, 130, 140 in order to form the spline joint 58 therebetween. In other words, the spline joints 58 are not capable of being established by snapping or clicking into place via elastic deformation of one or both mating components, and the protrusions 170 will only fit into respective first and second channels 94, 102 if the spline 54, 130, 140 is slid axially onto the first and second side edges 158, 162 of the wall panels 42.

Figure 15:
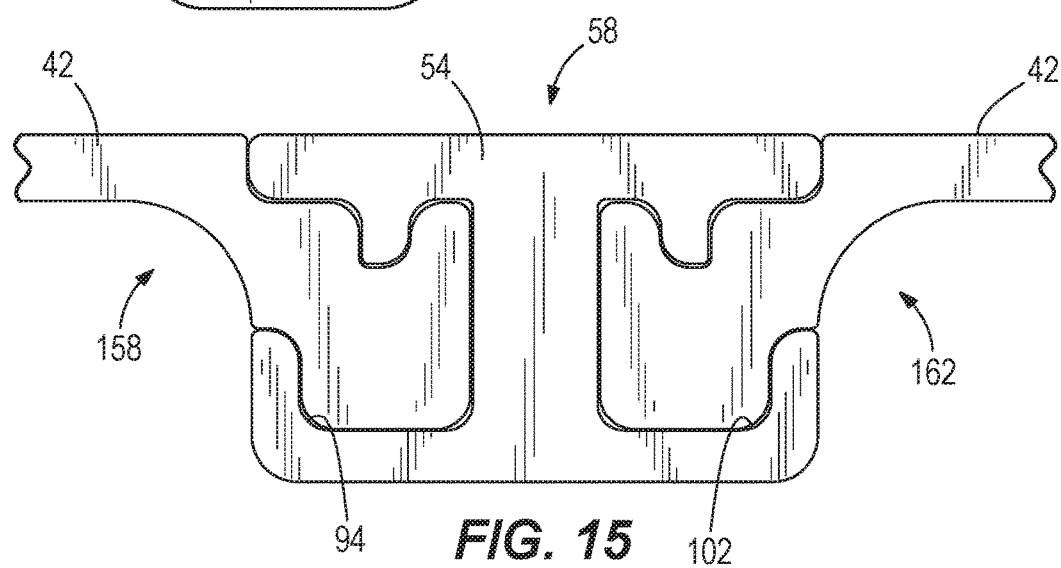
FIG. 15 is a top view of the spline joint of FIG. 4.
Figure 16:
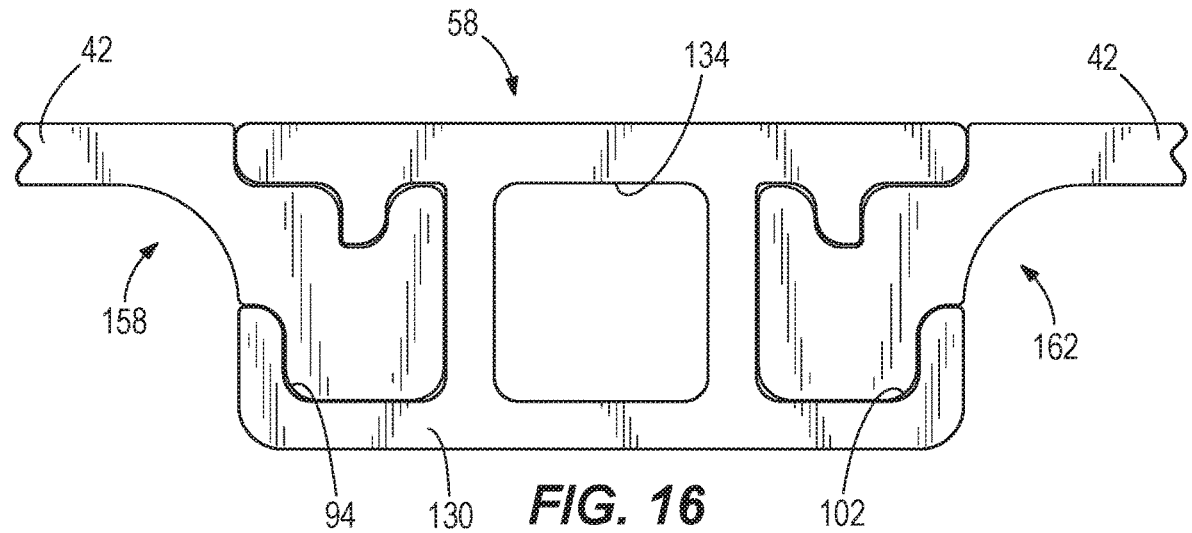
FIG. 16 is a top view of a spline joint according to another embodiment of the invention.

FIG. 15 illustrates a spline joint 58 including a spline 54 without the central channel 134. The spline joint 58 includes a first side edge 158 of a first wall panel 42 received within a first channel 94 and a second side edge 162 of a second wall panel 42 received within a second channel 102. FIG. 16 illustrates a spline joint 58 including a spline 130 with the central channel 134. The spline joint 58 also includes a first side edge 158 of a first wall panel 42 received within a first channel 94 and a second side edge 162 of a second wall panel 42 received within a second channel 102.

As discussed earlier, the wall panels 42 of the trailers 10 may span in a multitude of ways around the side walls 26, 30, and front wall 34 of the trailer 10. For example, a spline joint 130 may join two wall panels 42 on the first side wall 26 or the second side wall 30 of the trailer 10 (FIG. 21) or a spline joint 130 may join two wall panels 42 on the front wall 34 of the trailer 10 (FIG. 22). As such, the spline joints 58 may be spaced around the side walls 26, 30, and front wall 34 of the trailer 10 in a variety of ways. In addition, the side walls 26, 30, and front wall 34 of the trailer 10 may meet in different ways to form different kinds of corners (e.g., beveled 182, square 186, rounded 190, etc.). For example, as shown in FIG. 17, a spline joint 58 including a spline 130 with the central channel 134 may be positioned on either the first or second side wall 26, 30 of the trailer 10 next to a beveled corner 182 connecting a wall panel 42 on the front wall 34 to a wall panel 42 on one of the side walls 26, 30. With reference to FIG. 18, a spline joint 58 including a spine 130 may be positioned on a beveled corner 182 connecting a wall panel 42 on the front wall 34 to a wall panel 42 on one of the side walls 26, 30. Another example of a spline joint 58 with a spline 130, as shown in FIG. 19, may be positioned on either the first or second side wall 26, 30 of the trailer 10 next to a square corner 186 connecting a wall panel 42 on one of the side walls 26, 30 to a wall panel 42 on the front wall 34. A further example, as shown in FIG. 20, a spline joint 58 including the spline 130 with the central channel 134 may be positioned on either the first or second sidewalls 26, 30 of the trailer 10 next to a rounded corner 190 connecting a wall panel 42 on one of the side walls 26, 30 to a wall panel 42 on the front wall 34. Although FIGS. 17-22 illustrate spline joints 58 including the spline 130 of FIGS. 7 and 8 and no concavities 178, any or all of these joints can also be made with other embodiments disclosed herein, or various feature combinations thereof (e.g., with or without the central channel 134 and with or without the concavities 178 in any particular combination).

Figure 23:
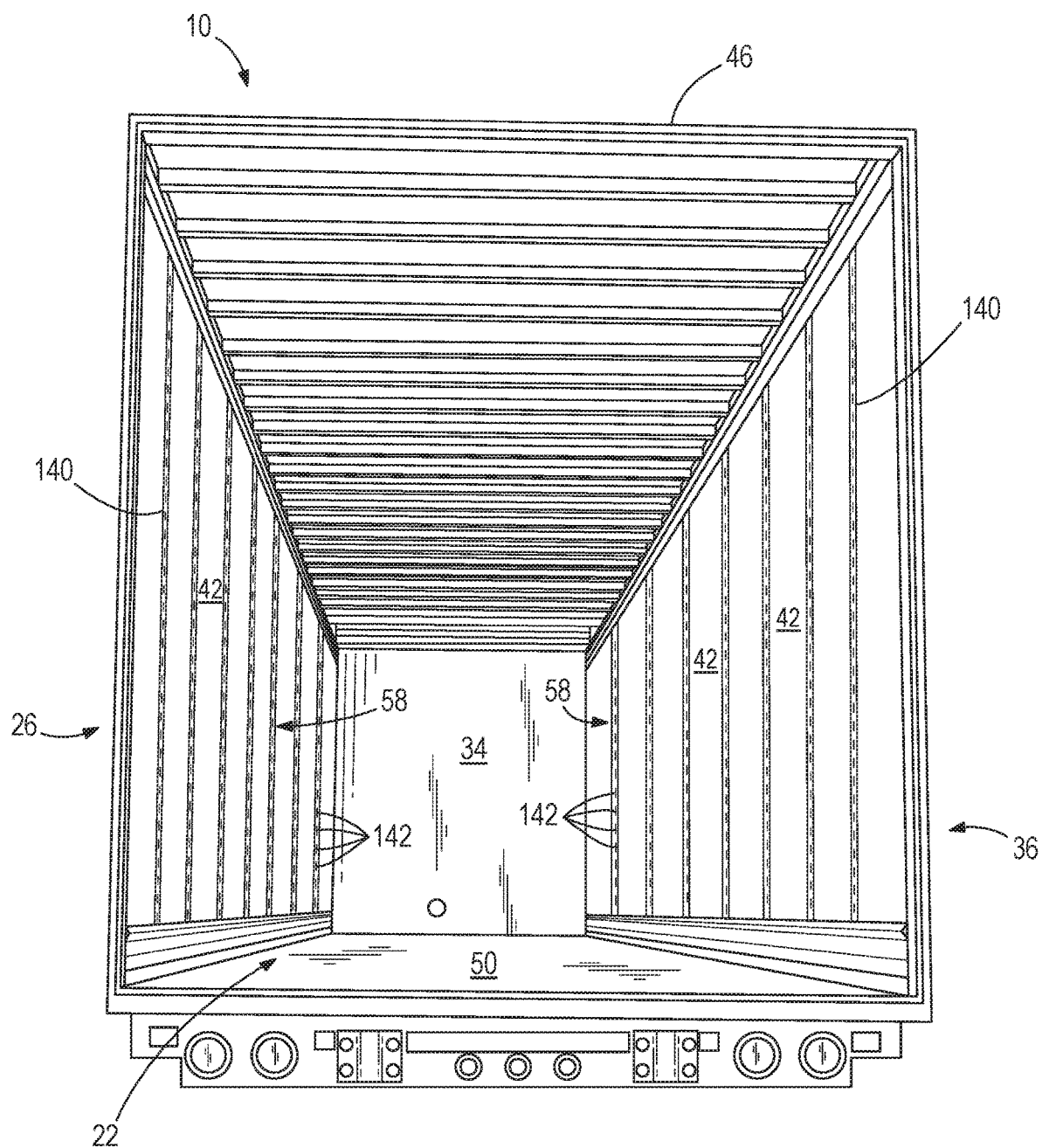
FIG. 23 is a perspective view of an interior of the container of FIG. 1.

FIG. 23 illustrates the interior 22 of the trailer 10 with all the wall panels 42 secured. The spline joints 58 are spaced around the first side wall 26, the second side wall 30, and the front wall 34. The splines 140 of the spline joints 58 all include logistic slots 142 that are configured to support fastening of additional structures inside the interior 22 of the trailer 10. In other embodiments, only selected splines 140, or none of the spline 140, include logistic slots 142.

In some embodiments, the spline 54, 130, 140 of the spline joint 58 does not extend the entire length between the top edge 150 and bottom edge 154 of the first and second wall panels 42. The spline 54, 130, 140 may only extend partially between the top and bottom edges 150, 154 of the first and second wall panels 42 to allow space for additional fastening means above and below the spline joint 58. In further embodiments, the spline 54, 130, 140 may extend further than the first and second wall panels 42 to establish direct or indirect engagement with the top and bottom rails 78, 82.

Various features and advantages of the invention are set forth in the following claims.

What is claimed is:

1. A container defining a cargo receiving interior defined by a plurality of panels, the container comprising:
    a first panel having a first edge, the first edge having a first protrusion with a first contoured profile, the first contoured profile having at least one projection;
    a second panel having a second edge, the second edge having a second protrusion with a second contoured profile, the contoured profile having at least one projection; and
    a spline including a first channel that defines a recess with an interior profile, and a second channel separate from the first channel that defines a recess with an interior profile, wherein the first channel receives the first protrusion of the first panel such that the first contoured profile is complementary to a portion of the interior profile and wherein the second channel receives the second protrusion of the second panel such that the second contoured profile is complementary to a portion of the interior profile;
    wherein the first panel further includes a mid-section extending from the first edge and the second panel further includes a mid-section extending from the second edge, wherein the first edge has a greater thickness than the thickness of the mid-section of the first panel and the second edge has a greater thickness than the thickness of the mid-section of the second panel.

2. The container of claim 1, wherein the interior profile of each of the first and second channels includes four sides.

3. The container of claim 2, wherein the four sides are rectangular-shaped with adjacent sides of the four sides being perpendicular to one another.

4. The container of claim 1, wherein the first and second protrusions are offset inward toward an interior of the container from a plane that is defined by an interior surface of the panels.

5. The container of claim 1, wherein the first contoured profile extends an entire length of the first edge from a top edge of the first panel to a bottom edge of the first panel and wherein the second contoured profile extends an entire length of the second edge from a top edge of the second panel to a bottom edge of the second panel.

6. The container of claim 1, wherein the first and second channels open in opposite directions.

7. The container of claim 6, wherein the first and second channels are symmetrical to each other about a plane that extends through the spline.

8. The container of claim 1, wherein the spline further includes a central channel positioned between the first channel and the second channel.

9. The container of claim 8, wherein the spline further includes slots through an interior wall of the central channel, the interior wall facing an interior of the container.

10. A container defining a cargo receiving interior defined by a plurality of panels, the container comprising:
    a first contoured edge of a first panel;
    a second contoured edge of a second panel; and
    a spline with a first channel that receives the first contoured edge and a second channel that receives the second contoured edge to form a spline joint securing the first and second panels together, the first and second channels being symmetrical with openings in opposite directions;
    wherein each of the first and second contoured edges includes a concavity containing an adhesive that bonds a surface of the respective first and second contoured edges with a surface of respective first and second channels of the spline.

11. The container of claim 10, wherein the spline extends an entire length of the first contoured edge from a top edge of the first panel to a bottom edge of the first panel and an entire length of the second contoured edge from a top edge of the second panel to a bottom edge of the second panel.

12. The container of claim 10, wherein the spline further includes a central channel positioned between the first and second channel.

13. The container of claim 12, wherein the spline further includes slots through an interior wall of the central channel, the interior wall facing an interior of the container.

14. The container of claim 10, wherein the container is a trailer having a chassis with wheels and the first panel is a side wall panel of the trailer and the second panel is a front wall panel of the trailer.

15. The container of claim 10, wherein the container is a trailer having a chassis with wheels and the first panel is a first side wall panel of the trailer and the second panel is a second side wall panel of the trailer.

16. A method of assembling a container, the container defining a cargo receiving interior defined by a plurality of panels, the method comprising:
    providing a first panel with a first contoured edge and a second panel with a second contoured edge, the first panel and the second panel being held fixed relative to each other to define a space between the first and second contoured edges;

providing a spline with two symmetrical channels that open in opposite directions;

sliding the spline axially and simultaneously onto the first and second contoured edges and into the space therebetween so that a first one of the two symmetrical channels receives the first contoured edge, and a second one of the two symmetrical channels receives the second contoured edge to from a spline joint securing the first panel to the second panel; and after the first and second panels are secured, applying an adhesive to a concavity on the first contoured edge to bond a surface of the first contoured edge with a surface of one of the two symmetrical channels, and applying an adhesive to a concavity on the second contoured edge to bond a surface of the second contoured edge with a surface of the other of the two symmetrical channels after the first and second panels are secured.

17. A container defining a cargo receiving interior defined by a plurality of panels, the container comprising:

a first panel having a first edge, the first edge having a first protrusion with a first contoured profile, the first contoured profile having at least one projection;

a second panel having a second edge, the second edge having a second protrusion with a second contoured profile, the contoured profile having at least one projection; and a spline including a first channel that defines a recess with an interior profile, and a second channel separate from the first channel that defines a recess with an interior profile, wherein the first channel receives the first protrusion of the first panel such that the first contoured profile is complementary to a portion of the interior profile and wherein the second channel receives the second protrusion of the second panel such that the second contoured profile is complementary to a portion of the interior profile;

wherein each of the first and second contoured profiles includes a concavity containing an adhesive that bonds a surface of the respective first and second contoured profiles with a surface of the interior profile of the respective first and second channels of the spline.

18. A container comprising:

a first wall panel having a first edge, the first edge having a first protrusion with a first contoured profile;

a second wall panel having a second edge, the second edge having a second protrusion with a second contoured profile; and a spline including a first channel that defines a recess with an interior profile, and a second channel separate from the first channel that defines a recess with an interior profile, wherein the first channel receives the first protrusion of the first wall panel such that the first contoured profile is complementary to a portion of the interior profile and wherein the second channel receives the second protrusion of the second wall panel such that the second contoured profile is complementary to a portion of the interior profile;

wherein the first wall panel further includes a mid-section extending from the first edge and the second wall panel further includes a mid-section extending from the second edge, wherein the first edge has a greater thickness than the thickness of the mid-section of the first wall panel and the second edge has a greater thickness than the thickness of the mid-section of the second wall panel.

19. The container of claim 18, wherein the first and second channels open in opposite directions.

20. The container of claim 18, further comprising adhesive bonding a surface of the respective first and second contoured edges with a surface of respective first and second channels of the spline.

* * * * *

UNITED STATES PATENT AND TRADEMARK OFFICE
CERTIFICATE OF CORRECTION

PATENT NO. : 11,136,073 B2
APPLICATION NO. : 16/852646
DATED : October 5, 2021
INVENTOR(S) : Gary L. Fenton Page 1 of 1

It is certified that error appears in the above-identified patent and that said Letters Patent is hereby corrected as shown below:

In the Specification

Under Column 2, on Line 12:
Please replace "from" with --form--.

In the Claims

In Claim 16, under Column 11, on Line 8:
Please replace "from" with --form--.

Signed and Sealed this
Twenty-first Day of December, 2021

Drew Hirshfeld
*Performing the Functions and Duties of the*
*Under Secretary of Commerce for Intellectual Property and*
*Director of the United States Patent and Trademark Office*